US006990354B2

(12) United States Patent
Kantola et al.

(10) Patent No.: US 6,990,354 B2
(45) Date of Patent: Jan. 24, 2006

(54) COMMUNICATION DEVICES AND METHOD OF COMMUNICATION

(75) Inventors: Matti Kantola, Oulu (FI); Kalle Kärkäs, Oulu (FI); Lauri Piikivi, Oulu (FI); Holger Hussman, Marl (DE); Valtteri Niemi, Helsinki (FI); Sander Van Valkenburg, Helsinki (FI)

(73) Assignee: Nokia Mobile Phones, Ltd., Espoo (FI)

( * ) Notice: Subject to any disclaimer, the term of this patent is extended or adjusted under 35 U.S.C. 154(b) by 629 days.

(21) Appl. No.: 09/848,459

(22) Filed: May 3, 2001

(65) Prior Publication Data

US 2002/0003481 A1 Jan. 10, 2002

(30) Foreign Application Priority Data

May 5, 2000 (GB) .................................. 0010983

(51) Int. Cl.
*H04B 1/38* (2006.01)

(52) U.S. Cl. .................................... 455/522; 455/41.2

(58) Field of Classification Search ................ 655/522, 655/69, 41.1, 13.4, 574, 127.1; 375/224
See application file for complete search history.

(56) References Cited

U.S. PATENT DOCUMENTS

| | | | | |
|---|---|---|---|---|
| 5,345,596 | A | 9/1994 | Buchenhorner et al. | 455/33.1 |
| 6,101,375 | A * | 8/2000 | Tuttle et al. | 455/127.2 |
| 6,445,732 | B1 * | 9/2002 | Beamish et al. | 375/224 |
| 6,697,375 | B1 * | 2/2004 | Meng | 370/465 |
| 6,705,520 | B1 * | 3/2004 | Pitroda et al. | 235/382.5 |

FOREIGN PATENT DOCUMENTS

| | | |
|---|---|---|
| CN | 1027611 C | 2/1995 |
| GB | 2342010 | 3/2000 |
| WO | WO 93/00750 | 1/1993 |

OTHER PUBLICATIONS

Japanese Patent document No. JP 9172409, English translation of the Abstract attached.

* cited by examiner

*Primary Examiner*—Nick Corsaro
*Assistant Examiner*—Tu X Nguyen
(74) *Attorney, Agent, or Firm*—Perman & Green, LLP.

(57) ABSTRACT

A communications device comprising means for transmitting a signal to another party; and means for controlling the signal level with which said transmitting means transmits, wherein said signal level is initially relatively low and when a connection is established with said another party, said signal level is increased.

22 Claims, 3 Drawing Sheets

COMMUNICATION DEVICES AND METHOD OF COMMUNICATION

FIELD OF THE INVENTION

The present invention relates to communication devices and a method of communication. In particular, but not exclusively, the present invention relates to wireless communications devices and a method of wireless communications.

BACKGROUND OF THE INVENTION

It has been proposed to use mobile stations instead of credit cards at a point of sale. In this proposal, it has been suggested that a wireless link be established between the point of sale device and the mobile station. The mobile station may provide the point of sale device with similar information to that provided by a credit card.

One problem with this proposal is how to ensure that the correct mobile station is connected to the point of sale device. For example, in a busy supermarket, there may be a large number of point of sale devices and a large number of mobile stations. It is important that the right point of sale device be connected to the right mobile station. Clearly, considerable problems would be caused if the wrong mobile station were connected to the wrong point of sale device. The user of a mobile station could be charged for goods not purchased by the user.

SUMMARY OF THE INVENTION

It is an aim of embodiments of the present invention to address the above problems.

According to a first aspect of the present invention, there is provided a communications device comprising means for transmitting a signal to another party; and means for controlling the signal level with which said transmitting means transmits, wherein said signal level is initially relatively low and when a connection is established with said another party, said signal level is increased.

The control means may be arranged to control the power of the signal. The control means may be arranged to control the signal level of the transmitted signal to be one of only two levels, the initially low level and the increased level. Alternatively, the signal level may be initially at a starting level and be increased at a relatively low level. The starting point may be no signal. The signal level may be increased until a connection is established with said another party. The signal level may have a maximum value to which it can be increased when no connection has been established with the another party. The maximum value may be less than the signal level used when a connection with another party has been established.

According to a second aspect of the present invention, there is provided a communications device comprising means for receiving a signal from another party; and means for controlling the signal level with which said signal is received, wherein said signal level is initially relatively low and when a connection is established with said another party, said signal level is increased.

According to a third aspect of the present invention, there is provided a communications method comprising the steps of transmitting initially a signal to another party at a relatively low signal level; establishing a connection with the another party; and increasing the signal level with which signals are transmitted to said another party after said connection has been established.

According to a fourth aspect of the present invention, there is provided a communications method comprising the steps of receiving a signal from another party; attenuating said received signal by a first amount; establishing a connection with the another party; decreasing or removing the attenuation applied to said received signals when a connection has been established.

BRIEF DESCRIPTION OF DRAWINGS

For a better understanding of the present invention and as to how the same may be carried into effect, reference will now be made by way of example only to the accompanying drawings in which:-

DETAILED DESCRIPTION OF EMBODIMENTS OF THE INVENTION

Figure 1:
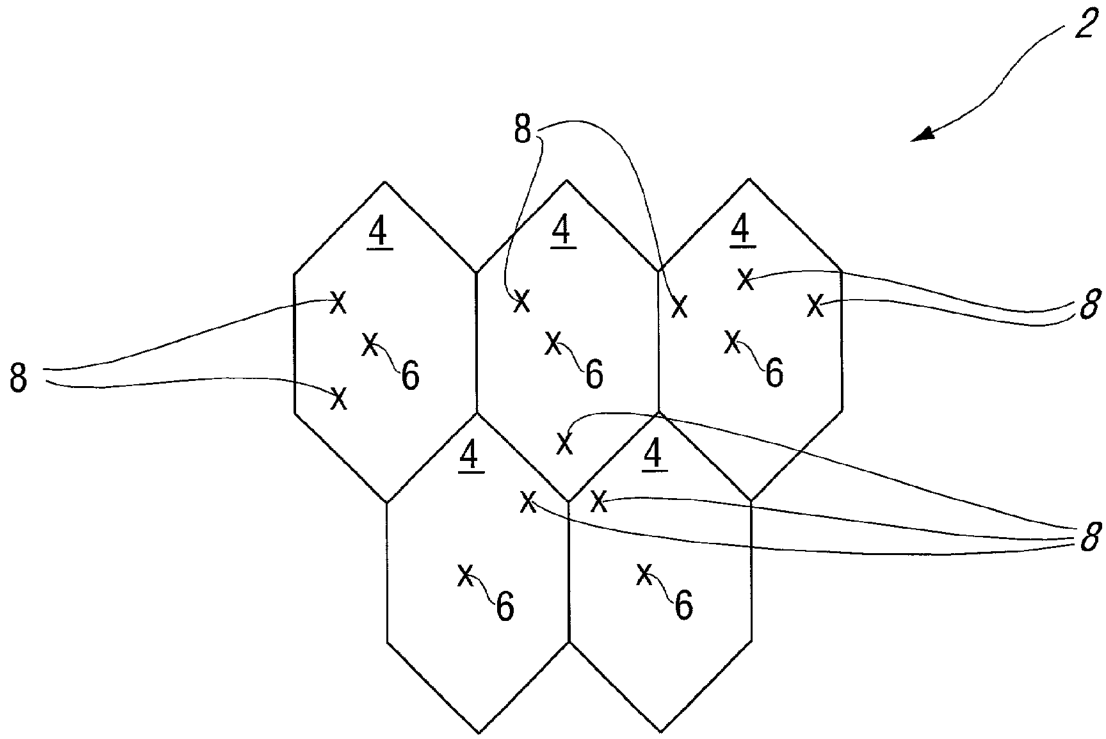
FIG. 1 shows a typical cellular telecommunications network.

Reference is made to FIG. 1 which shows a typical cellular telecommunications network. The area covered by the network 2 is divided into a plurality of cells 4. Each cell 4 is served by a base transceiver station 6. Each base transceiver station 6 is arranged to communicate with mobile stations 8 in the cell associated with that base transceiver station 6.

The cellular network 2 can use any suitable method of communication. Known methods of communication include those based on time division multiple access, frequency division multiple access and spread spectrum techniques such as code division multiple access. Hybrids of two or more of these access techniques can also be used. In the following description, the mobile station is described as operating in accordance with the UMTS (Universal Mobile Telephone System) standard, which uses code division multiple access. However, the mobile station can operate in accordance with any other suitable standard, for example GSM (Global System for Mobile Communications). GSM uses a time/frequency division multiple access technique.

Figure 2:
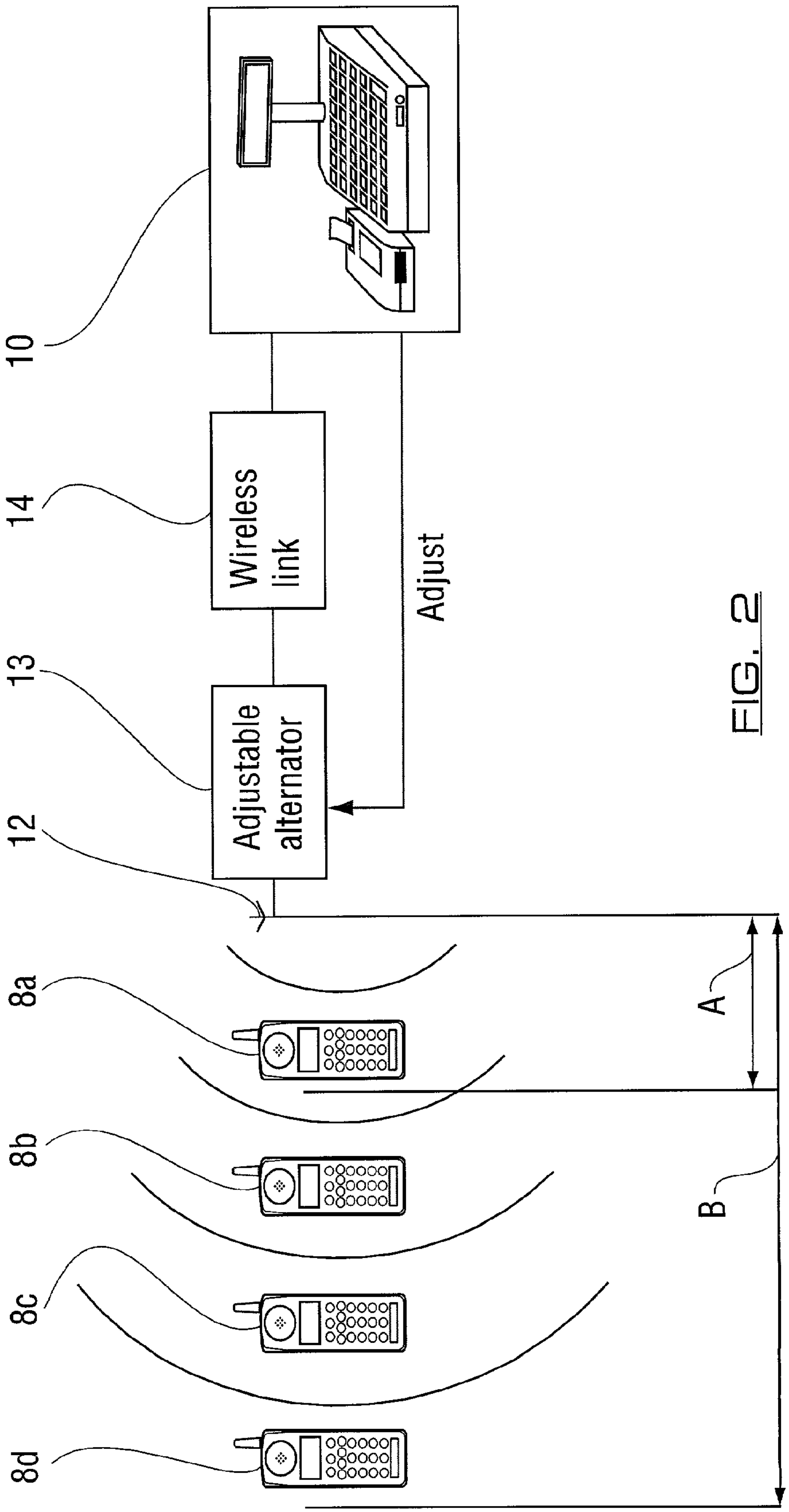
FIG. 2 shows a block diagram of an embodiment of the present invention.

Reference will now be made to FIG. 2 which shows a block diagram of an embodiment of the present invention. Shown in FIG. 2 is a service access point 10. The service access point, as will be discussed in more detail late, may be a point of sale device, a ticket gate, an information kiosk, ATM or any other suitable service access point.

The service access point 10 has an antenna 12. The antenna 12 is arranged to receive signals from a mobile station. The received signals are passed to an adjustable attenuator 13. The function of the attenuator 13 will be described in more detail hereinafter. The output of the attenuator 13 is connected to a wireless link 14. The wireless link 14 processes the received signals and puts the received data into a format which can be used by the main part 16 of the service access point. The wireless link may convert the received signal to a base band frequency and may carry out decoding and demodulation, as is well known.

The antenna 12 is also arranged to transmit signals to a mobile station. The wireless link 14 receives the data to be transmitted and puts it into a format suitable for transmission. The wireless link 14 may up convert the signals, encode and modulate the data before passing it to the adjustable attenuator 13. The signals are attenuated, if necessary by the attenuator 13 before being passed to the antenna 12 for transmission.

FIG. 2 illustrates how embodiments of the invention are able to overcome the difficulties described earlier. In the arrangement shown in FIG. 2, four mobile stations 8*a–d* are provided. Each of these four mobile stations is reasonably close to the service access point. In the embodiment of the invention, it is desired to establish a connection between the first mobile station 8*a* and the service access point. It is extremely disadvantageous if, by mistake, a connection were to be established with any of the other three mobile stations 8*b* to 8*d*.

The service access point 10 is able to adjust, using the adjustable attenuator 13, the power with which the antenna 12 transmits. The service access point is arranged, in preferred embodiments of the present invention to receive and transmit signals in accordance with the Bluetooth standard. The Bluetooth standard uses low power and high frequency signals (of the order of Giga Hertz).

If the Bluetooth signal were transmitted with its normal range of power, all of the four mobile stations 8*a–d* would be able to receive the Bluetooth signal from the service access point and accordingly a connection could be set up with any of the four mobile stations. To avoid this, the attenuator 13 is controlled so as to transmit initially with a very low power. This power is low enough such that the range of the signal is very small. For example, the signal may have a range of the order of a few centimeters, perhaps 10 or so centimeters. However this is an implementation issue and the initial range of the signals can have any suitable value.

This low level of power is maintained until a mobile station is within the short range of the service access point 10. A Bluetooth connection is then established between the mobile station and the service access point. Once the connection has been established, the attenuator 13 is controlled to increase the power of the signal transmitted by the antenna to more usual levels. Typically, the signal will then be strong enough to be received by the all of the four mobile stations. However as a connection has already been established with the correct mobile station, no further connection is established with any of the other mobile stations. Once a connection has been established, the communication link can optionally be encrypted if desired.

The attenuator 13 may have no attenuation effect on the signal to be transmitted once the connection with the correct mobile station has been established. The attenuator may simply have two modes. In the initial mode, the signal to be transmitted is attenuated by a fixed amount so that the signal has only the very short range A. In the second mode, the attenuator provides no attenuation and the signals have a longer range B. When a connection has been broken, the attenuator reverts to the initial mode.

In an alternative embodiment of the present invention, the initially transmitted signals may have the smallest range. If a connection is not established when the service access point is transmitting with the lowest power, the power may be increased by the attenuator until a connection is established. The increase in power may be gradual or stepwise. The power may be gradually increased from nothing. The attenuator may be controlled so that the signals are transmitted with up to a maximum power when no connection has been established. The maximum power may be the same as the power used when a connection has been established. However in preferred embodiments of the present invention, the maximum power is less than the power used when a connection has been established.

In preferred embodiments of the present invention, the attenuator has no effect on the received signals, only on the signals to be transmitted. However in alternative embodiments of the present invention the attenuator may attenuate the received signals some or all of the time.

Figure 3:
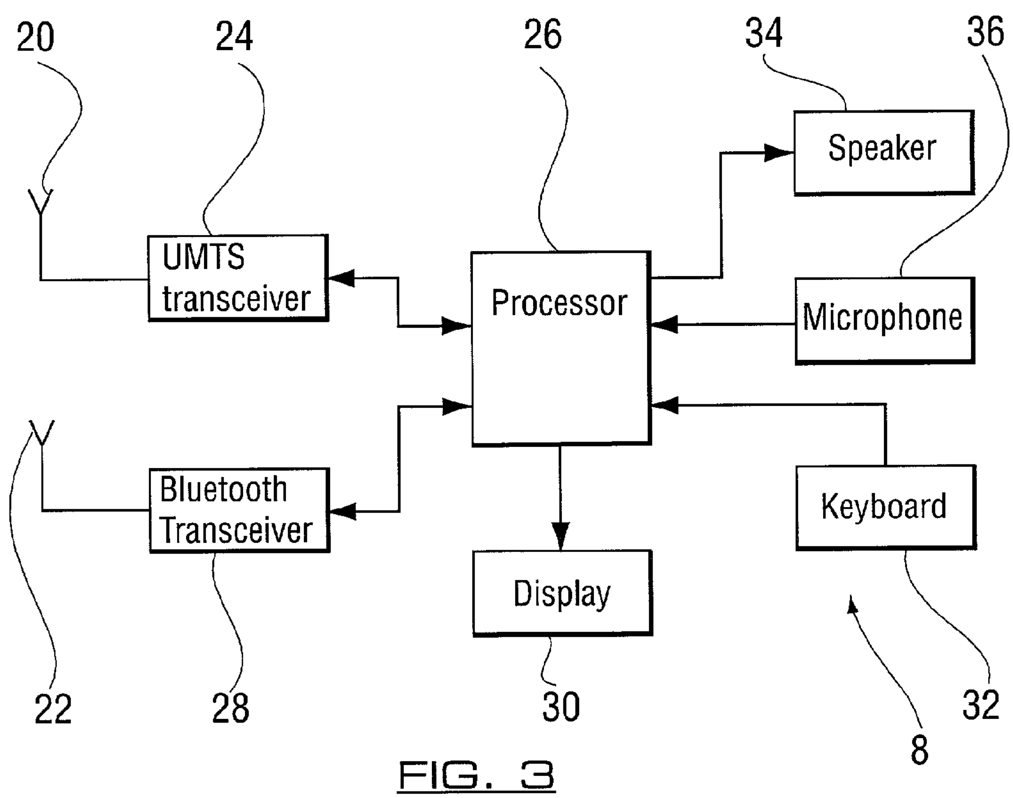
FIG. 3 shows the structure of the mobile station of FIG. 2.

The structure of the mobile station 8 is shown in FIG. 3. The mobile station 8 has a first antenna 20 and a second antenna 22. The first antenna 20 is connected to a UMTS transceiver 24. The UMTS transceiver 24 is arranged to receive signals from the antenna 20 at a UMTS frequency. The UMTS transceiver 24 decodes the signals, demodulates them and also reduces them to the base band frequency. The output of the UMTS transceiver 24 thus consists of a stream of data. That stream of data may require further processing by the processor 26.

The UMTS transceiver also receives data from the processor 26 which is to be transmitted by the mobile station. The UMTS transceiver 24 encodes, modulates and up converts the signal to the radio frequency which is to be used. The radio frequency signal is then transmitted by the antenna 20.

The second antenna 22 is connected to a Bluetooth transceiver. Bluetooth is a proposed new standard that uses relatively low power radio frequency signals. The frequency may be in the GHz range. This is quite different to the UMTS frequencies. For this reason, separate antennas 20 and 22 are usually provided for the two different types of signal. The Bluetooth transceiver 28 receives Bluetooth frequency signals from the second antenna 22 and decodes, demodulates and down converts those signals. The data output by the Bluetooth transceiver 28 is input to the processor 26. The processor 26 is also arranged to provide data to the Bluetooth transceiver 28 which is to be transmitted by the Bluetooth antenna 22. This data is up converted to the Bluetooth frequency, modulated and encoded before being transmitted by the second antenna 22.

The mobile station 8 also has a display 30. The display is controlled by the processor 26 and provides information for the user. A keypad 32 is provided to allow the user to input numbers and other information. The information input via the keypad 32 is input to the processor 26 which may be controlled in accordance with the input information. The mobile station has a speaker 34. This is controlled by the processor 26 and outputs audio signals which can be heard by the user. A microphone 36 is provided to pick up the user's voice. The microphone signals are input to the processor 26 which converts the signals into a format suitable for output to the UMTS transceiver 24.

Figure 4:
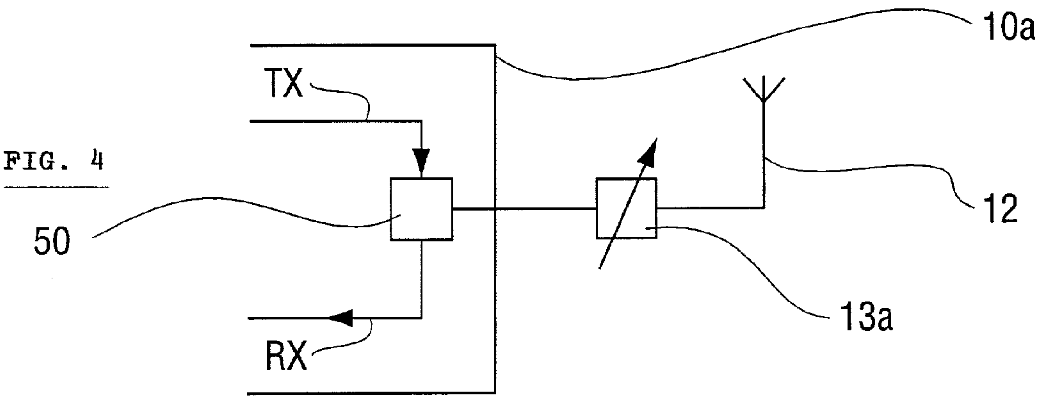
FIG. 4 shows a service access point with attenuation of the received and transmitted signals.
Figure 5:
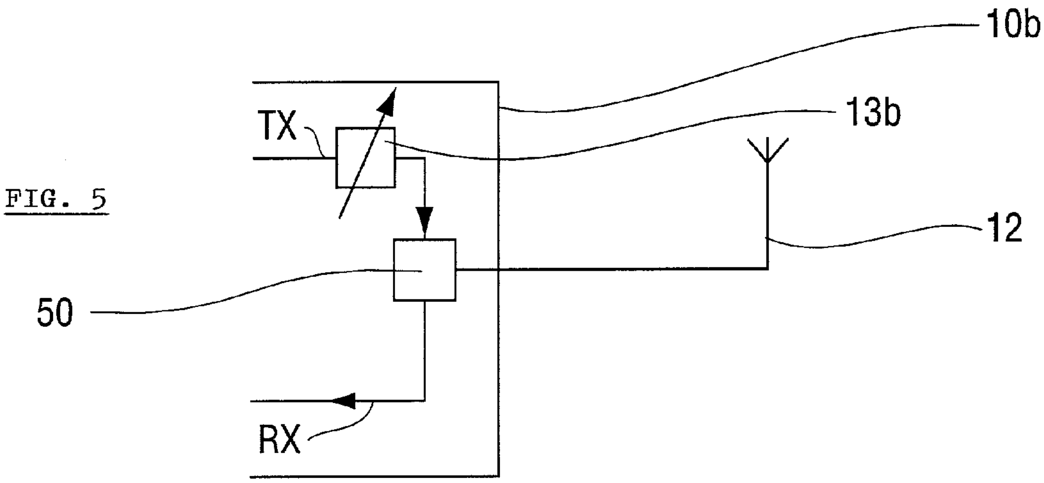
FIG. 5 shows a service access point with attenuation of the transmitted signals only.
Figure 6:
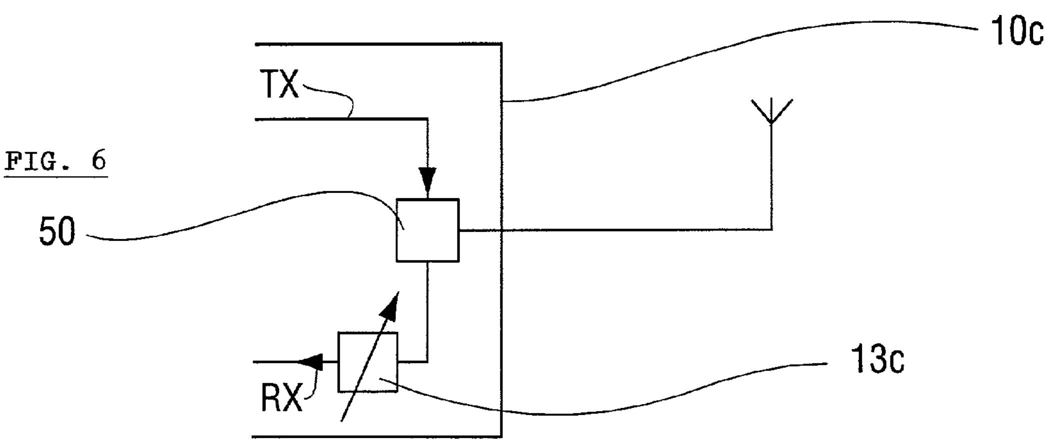
FIG. 6 shows a service access point with attenuation of the received signals only.

Reference will now be made to FIGS. 4, 5 and 6. In FIG. 4, the service access point 10*a* is arranged to attenuate signals that are both received and transmitted by the antenna 13*a*. The signals to be transmitted are input to a duplex filter 50. The transmit signals are output by a wireless link, as shown in FIG. 2 to the duplex filter 50. The signals to be transmitted are attenuated by the attenuator 13*a* as described in relation to FIG. 2 before being transmitted by the antenna 12.

The signals, which are received by the antenna 12, are also input to the attenuator 13*a* which attenuates them. This means that signals from mobile stations further away from the service access point are not output from the attenuator or have a very low power. The attenuator 13*a* can be controlled to attenuate the received signals in a similar way to that described in relation to the transmitted signals. The attenuation of received signals may therefore be greater when the connection is being established and less when the connection has been established.

Reference is made to FIG. 5 which shows for comparative purposes part of the arrangement of FIG. 2. The service access point 10*b* is arranged to attenuate only the transmitted signals. The signals to be transmitted are attenuated by the attenuator 13*b* after the wireless link circuitry and before the signals are input to the duplex filter 50.

Reference is made to FIG. 6 which shows a service access point 10*c* where only the received signals are attenuated. The attenuator 13*c* is arranged to received signals received by the antenna 12 via the duplex filter 50. The attenuator attenuates the signals which are received before they are processed further. The attenuator may be controlled in a similar manner to the attenuator described in relation to FIG. 2. When a connection is established the received signals are attenuated to remove the signals other than from a very close mobile station. The attenuation may be removed or reduced once a connection has been established.

The preferred embodiments of the present invention have been described as using a Bluetooth link. However, it should be appreciated that any other suitable radio frequency can be used. For example, infrared frequencies may be used. Preferred embodiments of the present invention use a short range connection between the mobile station and the service access point. However, this may not be required in certain embodiments of the present invention.

Embodiments of the present invention have a number of different applications. In one embodiment, the mobile station is used to make a transaction a point of sale or similar device and effectively acts as a credit card, a debit card or an electronic purse. Credit card information for money transfer is provided to the point of sale or similar device using the Bluetooth connection link which is established between the service access point and the mobile station. For example once the link has been established, the mobile station provides the point of sale device with credit card details of the user and authorisation for the transaction. Other information such as the identity of the user may also be provided.

Embodiments of the present invention can for example be used at ticket gates. The mobile station includes a ticket to go to a film, concert, sports match or the like. The Bluetooth connection is established between the mobile station and the ticket gate using the identification information. The confirmation of the ticket details is then provided to the ticket gate from the mobile station via the Bluetooth link.

Embodiments of the invention can be used to obtain information from an information station. The link is established and the information is exchanged using the Bluetooth connection. For example, the user can obtain train times etc from the information kiosk.

In an alternative embodiment of the present invention, the mobile station can be used to communicate with an automatic teller machine ATM to complete financial operations such as the loading of cash to an electronic purse, the withdrawal of cash or the like. The secure communication link between the station and the ATM is established with the ATM as discussed hereinbefore.

In some embodiments of the present invention, the mobile station may be arranged to act solely as a credit card or the like. In that case the UMTS circuitry can be omitted. The mobile station may thus include only the Bluetooth related circuitry. The display, keypad, speaker and/or microphone may therefore be omitted.

The described embodiments of the present invention have used a technique for establishing a connection between a service access point and a mobile station. It should be appreciated that embodiments of the present invention can be used to establish communication between any two or more communication devices. For example, embodiments of the present invention can be used to establish a connection between two or more mobile stations.

In preferred embodiments of the present invention, the mobile station may be replaced by any suitable communication device. Likewise the service access point can be replaced by any suitable communication device. In some embodiments of the present invention the communication capabilities of the communication device and/or the service access point may be very limited. In alternative embodiments of the present invention, the communication capabilities of the communication device and/or the service access point may be more extensive.

In some embodiments of the present invention, the antenna of the service access point may be omni directional. In other embodiments of the present invention, the antenna may be directional.

The normal range of the antenna of the service access point may be of the order of 10 meters. However this is an implementation issue and the normal range may be any suitable value.

The invention claimed is:

1. A communications device comprising:

means for transmitting a signal to another party; and means for controlling the signal level with which said transmitting means transmits, wherein said controlling means is arranged to control said signal level to be initially relatively low and to increase said signal level until a connection is established with said another party, and when a connection is established with said another party, to increase said signal level to another level that exceeds a maximum value to which the signal level can be increased when no connection has been established with said another party, wherein when a plurality of another parties are provided, said communications device attempts to establish a connection with a closest another party of the plurality of another parties.

2. A communications device as claimed in claim 1, wherein said control means is arranged to control the power of said signal.

3. A communications device as claimed in claim 1, wherein said control means is arranged to control the signal level of the transmitted signal to be one of only two levels, the initially relatively low level and the increased level.

4. A communications device as claimed in claim 1, wherein said signal level is initially at a starting level and is increased to the relatively low level.

5. A communications device as claimed in claim 1, wherein said starting point is no signal.

6. A communications device as claimed in claim 1, wherein said communications device is one of the following devices:

point of sale device; ticket gate device; and information kiosk; ATM.

7. A communications device as claimed in claim 1, wherein said connection with said another party is a wireless connection.

8. A communications device as claimed in claim 7, wherein said wireless connection is a high frequency connection.

9. A communications device as claimed in claim 8, wherein said high frequency connection is of the order of giga Hertz.

10. A communications device as claimed in claim 9, wherein said wireless connection is a Bluetooth link.

11. A communications device as claimed in claim 7, wherein the wireless connection is an infrared connection.

12. A communications device as claimed in claim 1, wherein said another party is a mobile telephone.

13. A communications device comprising:

means for receiving a signal from another party; and control means for controlling a signal level with which said signal is received, wherein said control means comprises an attenuator keeping said signal level initially relatively low and increasing the signal level until a connection is established to a level not exceeding a maximum value, and when a connection is established with said another party, increasing the signal level to a level exceeding the maximum value, wherein when a plurality of another parties are provided, said communications device attempts to establish a connection with a closest another party of the plurality of another parties.

14. A communications device as claimed in claim 13, wherein said control means is arranged to attenuate the signal level of the received signal by a first amount or a second amount only to provide the initially relatively low level and the increased level.

15. A communications device as claimed in claim 13, wherein said signal is arranged to be attenuated by a starting amount and the attenuation is reduced to provide signals at the relatively low level.

16. A communications device as claimed in claim 15, wherein said starting point is maximum attenuation.

17. A communications device as claimed in claim 13, wherein attenuation of the received signal level is decreased until a connection is established with said another party.

18. A communications device as claimed in claim 17, wherein said attenuation has a minimum value to which it can be decreased when no connection has been established with said another party.

19. A communications device as claimed in claim 18, wherein said minimum value is greater than the attenuation used when a connection with the another party has been established.

20. A communications device as claimed in claim 13, wherein no attenuation is applied to the received signals when a connection has been established.

21. A communications method comprising the steps of:

transmitting initially a signal to another party at a relatively low signal level;

increasing said signal level until a connection with the another party is established, wherein said signal level has a maximum value to which it can be increased when no connection has been established with said another party; and increasing the signal level with which signals are transmitted to said another party when said connection has been established wherein said maximum value is less than the signal level used when a connection with the another party has been established, wherein when a plurality of another parties are provided, said communications device attempts to establishes connection with a closest another party of the plurality of another parties.

22. A communications method comprising the steps of:

receiving a signal from another party;

attenuating said received signal by a first amount;

establishing a connection with the another party;

decreasing or removing the attenuation applied to said received signals when a connection has been established, wherein a plurality of another parties are provided, said communications device attempts to establishes a connection with a closest another party of the plurality of another parties.

* * * * *